US006909375B2

(12) United States Patent
Díaz-López (10) Patent No.: US 6,909,375 B2
(45) Date of Patent: Jun. 21, 2005

(54) SEISMIC SWITCH

(76) Inventor: William Díaz-López, P.O. Box 1081, Trujillo Alto, PR (US) 00978

( * ) Notice: Subject to any disclaimer, the term of this patent is extended or adjusted under 35 U.S.C. 154(b) by 78 days.

(21) Appl. No.: 10/439,160

(22) Filed: May 15, 2003

(65) Prior Publication Data

US 2003/0214416 A1 Nov. 20, 2003

Related U.S. Application Data

(60) Provisional application No. 60/381,372, filed on May 20, 2002.

(51) Int. Cl.$^7$ ............................................. G08B 21/00
(52) U.S. Cl. ..................... 340/690; 340/689; 340/521; 367/13
(58) Field of Search ................ 340/689, 690, 340/686.1, 539.22, 539.26, 566, 521, 522, 13; 367/197, 198, 199, 13; 73/35.14

(56) References Cited

U.S. PATENT DOCUMENTS

| | | | |
|---|---|---|---|
| 4,180,287 A | 12/1979 | Youngblood et al. | |
| 4,354,699 A | 10/1982 | Logan | |
| 4,528,559 A | 7/1985 | Freeman | |
| 4,652,862 A | 3/1987 | Verslycken | |
| 4,703,962 A | 11/1987 | Kelly et al. | |
| 4,803,482 A | 2/1989 | Verslycken | |
| 4,945,347 A | 7/1990 | Perry | |
| 4,992,669 A | 2/1991 | Parmley | |
| 4,995,651 A | 2/1991 | Wardlaw | |
| 5,149,157 A | 9/1992 | Laugery et al. | |
| 5,307,054 A | 4/1994 | Concannon, Sr. et al. | |
| 5,412,616 A | 5/1995 | González | |
| 5,420,380 A * | 5/1995 | Harben et al. ............... 181/122 | |
| 5,429,399 A | 7/1995 | Geringer et al. | |
| 5,436,416 A | 7/1995 | Fletcher | |
| 5,479,151 A | 12/1995 | Lavelle et al. | |
| 5,625,348 A * | 4/1997 | Farnsworth et al. ........ 340/690 |
| 5,742,235 A | 4/1998 | Miché | |
| 5,839,766 A | 11/1998 | Iannuzzi et al. | |
| 5,992,094 A * | 11/1999 | Diaz ............................. 49/31 |
| 6,049,287 A | 4/2000 | Yulkowski | |
| 6,265,979 B1 | 7/2001 | Chen et al. | |
| 6,298,603 B1 | 10/2001 | Díaz | |
| 6,308,644 B1 | 10/2001 | Díaz | |
| 6,311,714 B1 | 11/2001 | Watanabe | |
| 6,392,538 B1 * | 5/2002 | Shere ..................... 340/539.26 |
| 6,414,601 B1 | 7/2002 | Massedonio | |
| 6,476,858 B1 | 11/2002 | Díaz | |
| 6,518,878 B1 * | 2/2003 | Skoff ........................ 340/506 |
| 6,661,346 B1 * | 12/2003 | Wood et al. ................ 340/601 |
| 6,775,202 B2 * | 8/2004 | Mueller-Dombois ......... 367/13 |
| 2003/0014919 A1 | 1/2003 | Díaz | |

OTHER PUBLICATIONS

American Society of Civil Engineers—Earthquake–Actuated Automatic Gas Shutoff Devices—booklet—1999—American Society of Civil Engineers—USA.
U.S. Appl. No. 10/078,607, filed Feb. 19, 2002, Díaz–López.

* cited by examiner

*Primary Examiner*—Anh V. La
(74) *Attorney, Agent, or Firm*—Hoglund & Pamias, PSC (57) ABSTRACT

A seismic switch is a programmable device capable of distinguishing between seismic movements due to an earthquake or an explosion, which is used to send a signal to control panels for security doors. The device uses accelerometers and a microcontroller for the detection and signal analysis of the seismic movements. In the event of an explosion or earthquake, the device produces a loud sound which serves as an audible alarm. Other proposed applications, with minor modifications to the device or software code, include monitoring of freight handling, emergency shut-off controller for industrial control systems and machinery, a by-pass system for electronic access control panels, and as a theft-deterrent or a component of a security system for automated teller machines and other valuable devices or items.

24 Claims, 6 Drawing Sheets

SEISMIC SWITCH

CLAIM OF PRIORITY

Applicant claims all of the benefits of priority from provisional applicant No. 60/381,372, filed May 20, 2002, titled "Seismic Control Switch."

FIELD OF THE INVENTION

The invention relates generally to seismic detection and more specifically to controlling security functions including doors and alarms based upon seismic activity.

BACKGROUND OF THE INVENTION

Modem security systems have become increasingly sophisticated. Today, they are able to monitor for break-ins, smoke, fire, earthquakes, chemical releases and a host of other conditions requiring appropriate response. Often, these security systems interface not only with alarms to alert people of the emergency condition but also with remote monitoring facilities and emergency response teams such as the police or fire departments. In addition, these security systems can control the activation of sprinklers, the release of doors and other control functions.

Upon the detection of smoke, fire or other emergency conditions, it is especially critical to release doors, especially in crowded commercial establishments. The failure to release a single door can cause crowd panic and has in some instances resulted in the loss of life. For this reason, many methods have been applied to releasing doors under emergency conditions.

Some representative examples include: (1) U.S. Pat. No. 6,265,979, titled "Earthquake Sensing Device," to Chen and others; (2) U.S. Pat. No. 6,049,287, titled Door with Integrated Smoke Detector and Hold Open," to Yulkowski; (3) U.S. Pat. No. 5,429,399, titled "Electronic Delayed Egress Locking System," to Geringer and others; and (4) U.S. Pat. No. 4,803,482, titled "Exit Control and Surveillance System," to Verslycken. Each is incorporated herein in their entirety and each is described briefly in turn.

U.S. Pat. No. 6,265,979 generally teaches a device for detecting an earthquake and for controlling emergency functions. The device measures both horizontal and vertical vibrations. Based upon those measurements, the device determines whether an earthquake has occurred and if so releases doors.

U.S. Pat. No. 6,049,287 generally teaches a door control device that automatically releases a door upon detection of smoke. The door control device is physically mounted on the door and releases associated electronic locks.

U.S. Pat. No. 5,429,399 generally teaches a door control device that receives various alarm signals including smoke or seismic activity. In response to these alarm signals, the door control automatically releases associated door locks.

Finally, U.S. Pat. No. 4,803,482 generally teaches a door release and surveillance system. The door release is requested by a person by pressing a release lever at the door. This sends a signal to a central control location. The central location can monitor the door through a surveillance system. In response to the request it can elect to permit the door to release. Alternatively, it can delay or prevent the door to release should the central control location determine that there is not an emergency condition and the door should remain locked.

While each of the above discussed patents describes methods of releasing doors in response to alarm conditions such as fire or seismic activity, none address well or even appear to recognize the importance of distinguishing between different types of seismic activity. Specifically, both an explosion and an earthquake will cause vibrations but the two require different responses.

SUMMARY OF THE INVENTION

It is an object of the invention to distinguish between seismic activity resulting from earthquakes and explosions.

It is another object of the invention to release doors in response to the detection of an earthquake.

It is another object of the invention to release doors and to contact a remote monitoring center such as the fire department of police in response to the detection of an explosion.

According to one aspect of the invention, an emergency control system includes accelerometers, a controller, a first and a second switch. The accelerometers generate electronic signals in response to vibrations caused by an earthquake or an explosion. The controller is operationally coupled with the accelerometers and receives the electronic signals and to determine whether the electronic signals represent an earthquake or an explosion. The first switch is operationally coupled with the controller and with a door control circuit. The controller toggles the first switch upon detection of an earthquake to release the door control circuit. The second switch is operationally coupled with the controller, with the door control circuit and with an emergency call circuit. The controller toggles the second switch upon detection of an explosion to release the door control circuit and to activate the emergency call circuit.

According to further aspects of the invention, the accelerometers include one accelerometer configured to detect vibrations along a first axis, one accelerometer configured to detect vibrations along a second axis, orthogonal to the first axis, and one accelerometer configured to vibrations along a third axis, orthogonal to the first axis and the second axis. The controller includes analog-to-digital converters. The electric signals generated by the accelerometers are received by the analog-to-digital converters. The first switch and the second switch each comprise a relay. Alternatively, the first switch and the second switch each comprise an electronic switch. The emergency control system includes an alarm indicator operationally coupled with the controller to indicate an alarm condition upon detection of either an earthquake or an explosion. The emergency control system includes a keyed reset switch operationally coupled with the controller to reset the alarm condition. The emergency control system includes amplifiers operationally coupled between the accelerometers and the controller to amplify the electronic signals from the accelerometers before passing to the controller. The controller determines whether the electronic signals represent an earthquake or an explosion by comparing a representation of the electronic signals to a table of data. The emergency control system includes an explosion-proof and water-tight housing having a front face. The accelerometers, the amplifiers, the controller, the first switch and the second switch are mounted within the explosion-proof and water-tight housing. The visual alarm indicator, ready indicator, the keyed reset switch and the test switch are mounted on the front face.

According to another aspect of the invention, a method of responding to an emergency begins by generating an electronic signal in response to a seismic event. The electronic signal is converted to a digital representation. The digital representation is compared to a table of data to determine whether the seismic event was an earthquake or an explosion. In case of either an earthquake or an explosion, a control circuit is signaled. Only in the case of an explosion, a remote monitoring center circuit is signaled.

According to further aspects of the invention, the control circuit, the emergency call circuit and the audible alarm are reset in response to a keyed switch. Signaling the control circuit releases a man-trap door and shuts off equipment.

DETAILED DESCRIPTION OF THE INVENTION

In one preferred embodiment, a seismic detection and control circuit is connected with an external security system capable of activating alarms, releasing doors, initiating emergency calls and other control functions. In the event of seismic activity, the detection circuit determines whether an explosion or earthquake has occurred. If so, the control circuit activates the external security systems. Preferably, the seismic detection and control circuit is enclosed within an explosion proof box. On the front face, status lights indicate whether the device is active and whether an alarm condition has been detected, and control switches for testing and resetting the detection and control circuit are accessible to a user. Preferred embodiments and methods of operation are described further below with reference to the figures.

Figure 1:
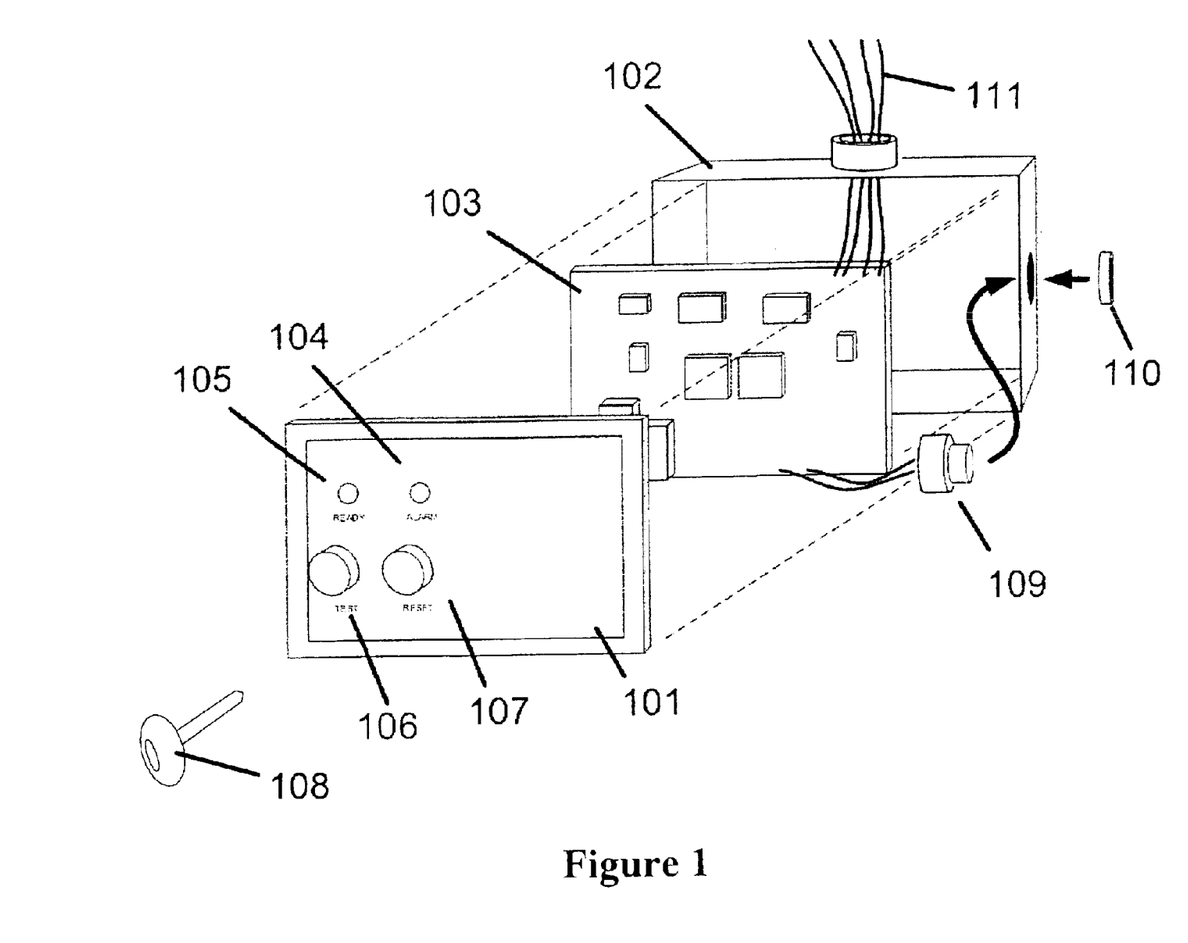
FIG. 1 is an exploded view of one preferred embodiment of a seismic switch.
Figure 2:
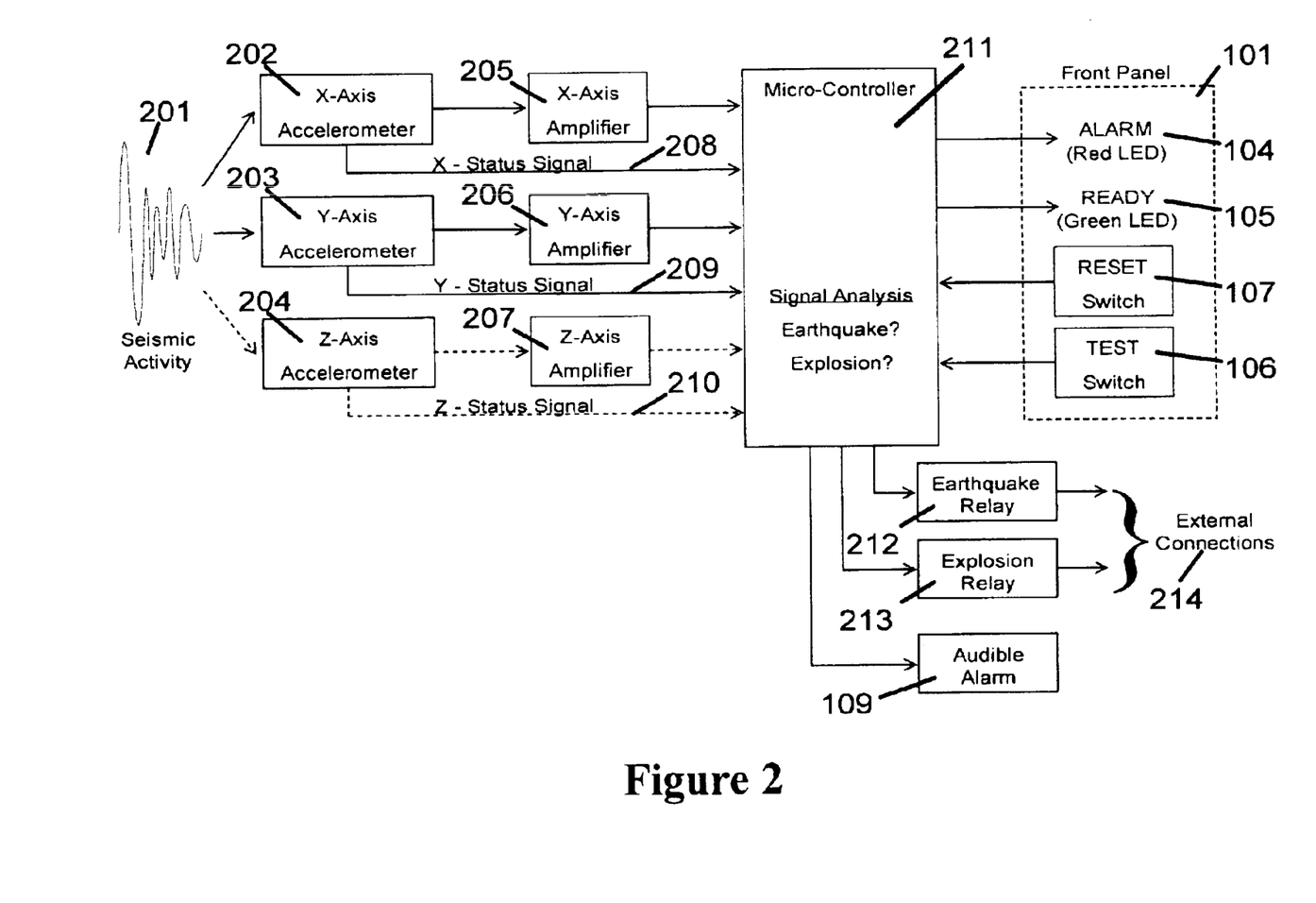
FIG. 2 is a functional block diagram of the seismic switch.
Figure 6:
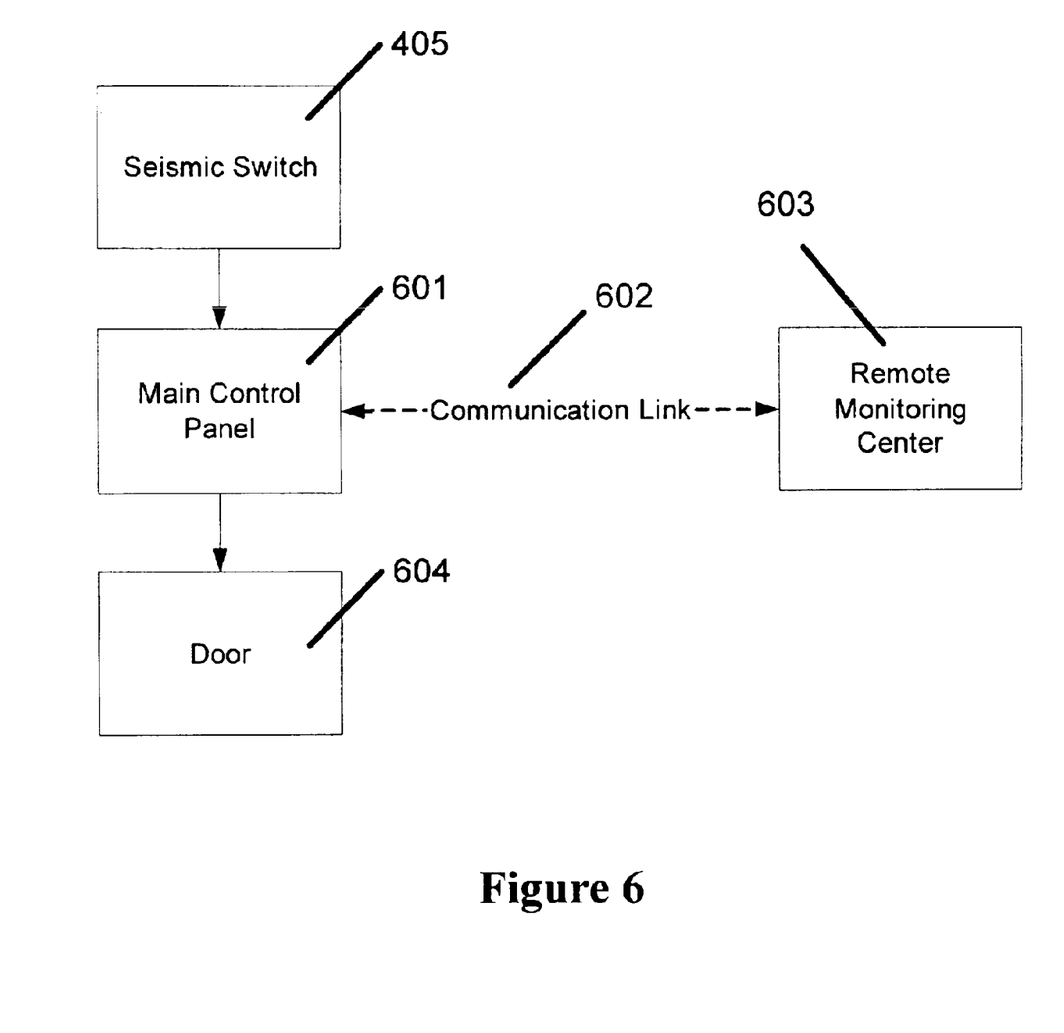
FIG. 6 is a functional block diagram of the seismic switch as it interacts with a typical security access control circuit.

Turning to FIG. 1, one preferred embodiment of a seismic control switch is described. Specifically, a seismic switch control circuit (103) is enclosed in a metal case (102) and has on the front panel (101) two push-button or keyed switches (106 and 107) and two indicator lights in the form of light emitting diodes or LEDs (104 and 105). A red LED (104) is labeled "Alarm". This light's turning on means that the microcontroller analyzed the detected vibrations and concluded that the vibrations were due to either an earthquake or an explosion and that an ALARM condition exists. A green LED (105) is labeled "Ready". This LED indicates that the system has performed a self test and that all tested parts are working correctly. The switch labeled "Test" (106) is used to instruct the microcontroller to test the ALARM condition, the relays (212 and 213, which are shown in FIG. 2), the audible alarm or buzzer (109), and the external circuit to which the seismic switch is connected (602, 603, 604, and 605, which are shown in FIG. 6). The audible alarm (109) is mounted on a side wall of the metal case (102) and is held in place by an external nut (110). The "Reset" switch (107) forces the microcontroller to clear the ALARM condition and to return to the initial state, including performing the "Test" function described above. Wires (111) for power and other connections to the external security system pass through a hole in the top face of the metal case (102).

Turning to FIG. 2, one preferred embodiment of the detection and control circuit is further described. During normal operation the Ready LED (105) remains on. If a seismic signal (201) is detected by the accelerometers (202, 203, and 204), it is decomposed into X, Y, and Z components and converted to electronic signals. These are passed through amplifiers (205, 206, and 207) and are input into the microcontroller (211) for signal analysis. The analysis determines whether the incoming signals correspond to an earthquake, an explosion, or neither. If the signals are interpreted as being those resulting from an earthquake, the ALARM LED (104) is turned on, the Ready LED (105) is turned off, the earthquake relay (212) is activated, and the audible alarm (109) is turned on. If the signals correspond to an explosion, a similar sequence of events is triggered; the ALARM LED (104) is turned on, the Ready LED (105) is turned off, the explosion relay (213) is activated, the audible alarm (109) is turned on, and, in addition, an emergency communication system (603) is activated by the explosion relay (213) to inform local authorities of the event. The circuit can only be reset back to normal operation through the manual activation of the RESET switch (107) by authorized personnel. In one preferred embodiment, a keyed switch is used, so that resetting the device requires the right key (108). In another preferred embodiment, the reset is a pushbutton switch. So that only authorized persons can reset the device, the seismic switch is mounted within keyed box or otherwise restricted area.

The circuit for the two-dimensional seismic switch is composed of eight main components as shown in FIG. 2, namely two accelerometers (202 and 203), two amplifiers (205 and 206), a microcontroller (211), two relays (212 and 213), and a buzzer (109). Each accelerometer-amplifier pair corresponds to one of the Cartesian X and Y directions making up the horizontal plane, with a 90° angle between their axis. The extra components needed for the three-dimensional version of the seismic switch are also shown in FIG. 2 using dashed lines: an accelerometer (204) and an amplifier (207). These would be used to detect vibrations in the Z (or vertical) direction. The accelerometers convert changes in velocity (acceleration) into electronic voltage signals. These signals are then amplified to increase the instrument's sensitivity to seismic movement (201). The amplified signals are then fed into the microcontroller's analog-to-digital converters (ADCs), which automatically convert the signals to digitally encoded representations of the signals. The microcontroller (211) has subroutines to continuously monitor incoming signals and, in the event that it recognizes a signal's characteristics as those pertaining to an earthquake or an explosion, it activates the earthquake relay (212) or the explosion relay (213), respectively. At the same time, an audible signal is produced by the buzzer (109). The signal patterns of interest have been pre-programmed into the microcontroller (211) using tables that correlate each accelerometer's digitally encoded signal amplitudes, plus the signal's period, and thus its frequency. These tables are explained below, as part of the microcontroller's programming.

The microcontroller unit (211), or MCU, chosen to implement the seismic switch is a Motorola MC68HC908GP32 8-bit microcontroller. This microcontroller has 32 kB of FLASH memory, so that it can be programmed using C code to suit the application's needs. In addition, the MCU has two timers, eight channels of analog-to-digital converters, and a serial port, which allows for programming the unit after installation.

Figure 3:
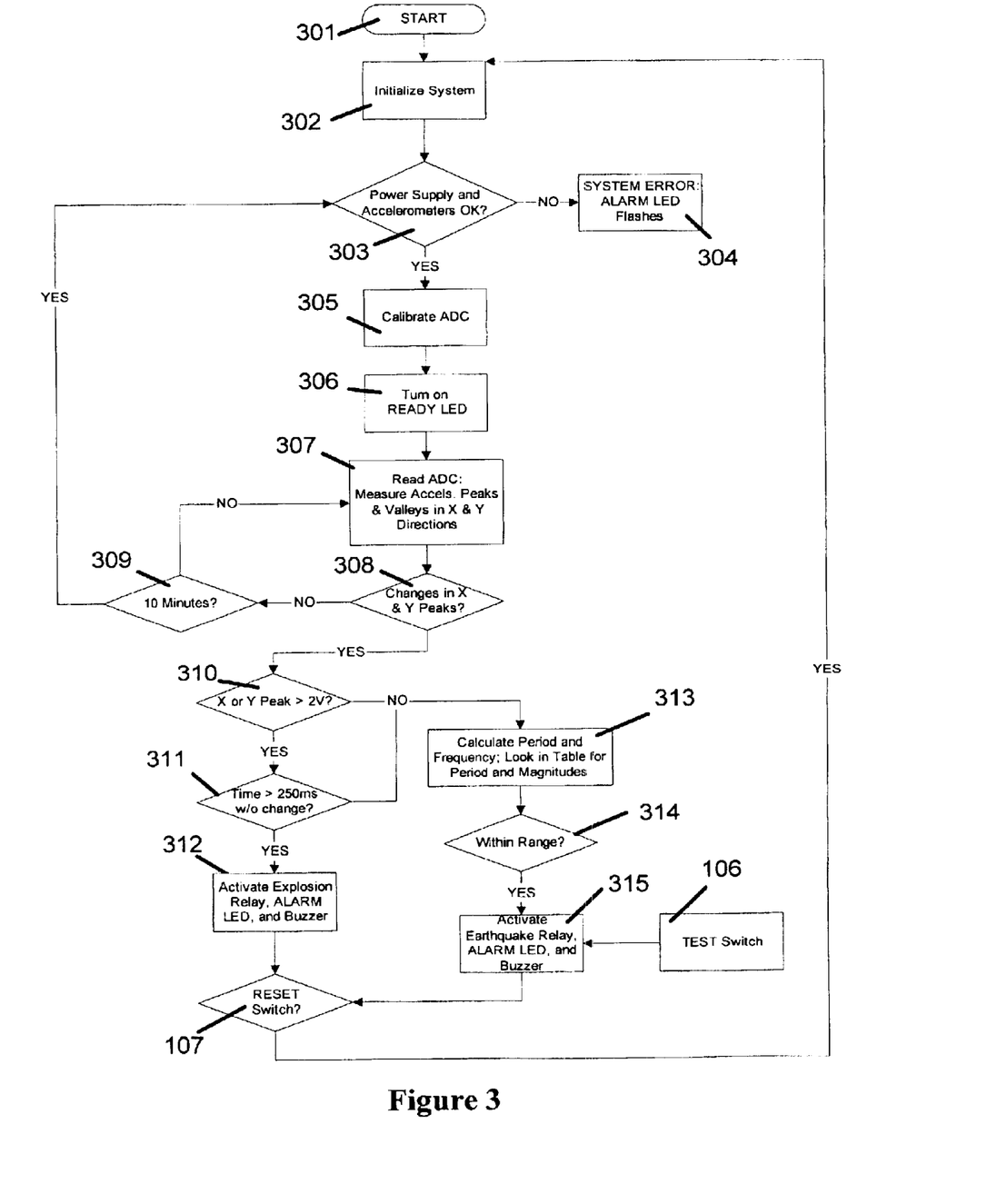
FIG. 3 is a flowchart of the control algorithm for the seismic switch.

Turning to FIG. 3, one preferred method of operating the seismic switch is described. When the unit is initially turned-on (301) or the RESET (107) switch is activated, the MCU initializes (302) the complete system, checks the power supplies and accelerometers (303), and then proceeds to take samples at the ADC inputs being used in order to calibrate the system (305). The accelerometers have status signals (208, 209, and 210) that are monitored by the MCU. If an error is detected during the initialization or testing stages (303), the MCU will make the red ALARM LED (104) continuously flash to indicate that a system error has occurred (304). Once the MCU has initialized, tested and calibrated the unit, it turns on the green Ready LED (105) to indicate that the system is working properly (306).

The MCU then goes into its regular mode of operation. It will read data (307) from the accelerometer-amplifier pairs to monitor changes in either the X or Y signals amplitudes. While sampling is performed, the peaks and valleys pertaining to each signal are averaged to reduce possible noise and false alarms. If ten minutes pass (309) and there are no significant and sustained changes in any of the peaks or valleys (308), the MCU will cycle through the testing and calibration sections and repeat the monitoring stage for another ten minutes. This pattern of sampling for ten minutes and testing will go on until changes occur in the peaks and valleys (308) or until the unit is set to the TEST mode via the TEST switch (106), to the RESET mode with the RESET switch (107), or if the unit is turned off by disconnection.

In order to detect the occurrence of an explosion, the occurrence of amplifier output saturation is monitored. If both X and Y amplifier (205 and 206) voltages exceed 2V (310) (corresponding to 0.33 g) for 250 milliseconds (311), the signal is interpreted as being due to an explosion and the actions pertaining to an explosion (312) are taken: namely, the ALARM LED (212) is turned on, the audible alarm is activated (109), and an emergency call is placed to a central monitoring center (604) and local authorities through a communication link (603). Since averaging of the input signals is being performed, noise effects and transients are filtered, thus minimizing the possibility of false triggering.

Figure 4:
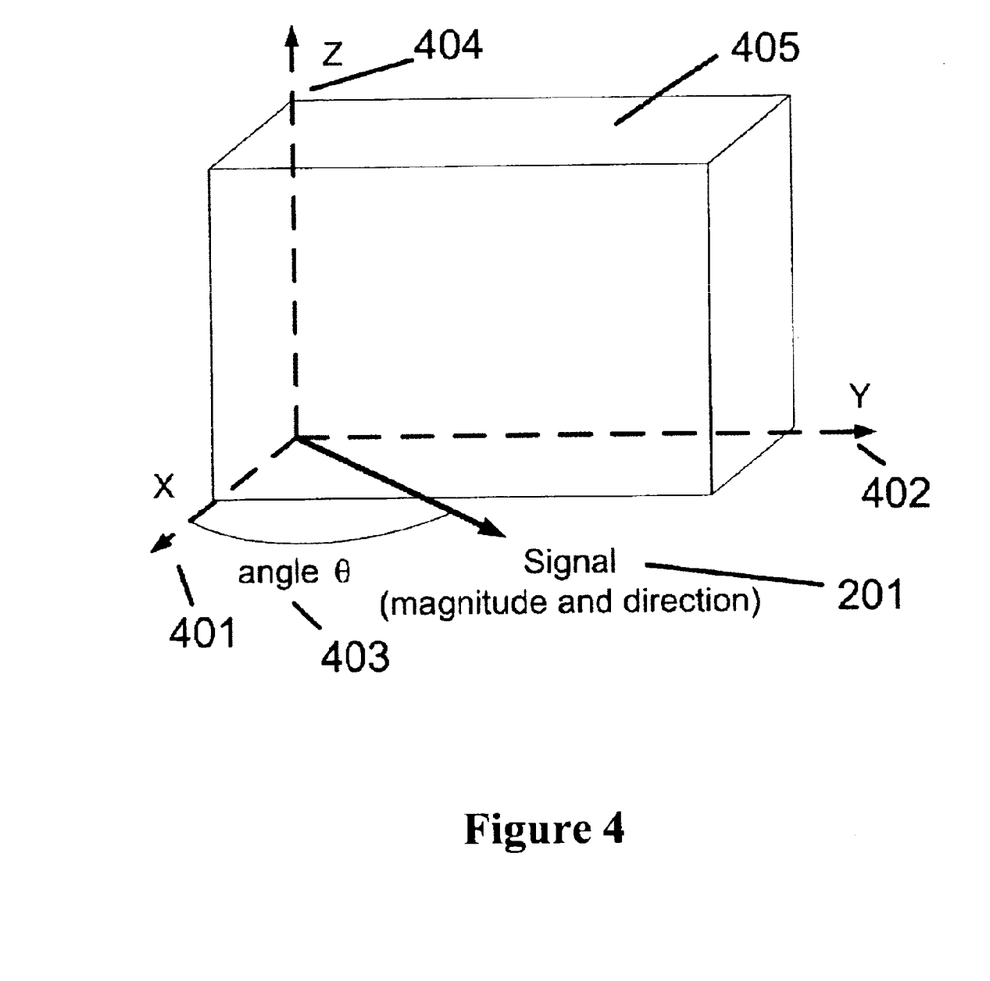
FIG. 4 is a perspective view of the seismic switch depicting the angle made from the signal to the seismic switch X-axis.

With reference to FIG. 4, the principle of operation behind one preferred earthquake signal analysis algorithm is now described. When a traveling signal (201) approaches a point in space, it possesses two important components, namely magnitude and direction, which together define the signal as a vector. If the magnitude and direction are known, the signal vector can be decomposed into X and Y components in the X (401) and Y (402) axis, respectively. By defining the angle (direction) between the X-axis (401) and the signal vector (201) as theta (θ) (403), simple trigonometry allows for vector decomposition into X and Y components: the X component being the signal's amplitude times the cosine of θ, and the Y component being the signal's amplitude times sine of θ. At the same time, the acceleration forces (relative to Earth's gravitational acceleration, g) in an earthquake's signal represent the magnitude of the vector. Thus, the key element for the seismic switch (405) is to determine if the signal's amplitude, frequency, and duration is that from an earthquake. The amplitude requirement can be analyzed by setting an acceleration threshold value, so that if the signal's magnitude (acceleration) is greater than this threshold, it establishes the possibility that the signal might be that from an earthquake. To accomplish this, the threshold is decomposed into its X and Y components, converted to their respective digital equivalent representations and included in the code as a table. This allows for the MCU to compare these values to the digitized signals from the X and Y accelerometers. If both the X and Y components of the detected signal are larger than the corresponding threshold values (308), the signal could be that from an earthquake.

The signal's period and/or frequency are then needed to complete this two-part test. The program uses one of the MCU's internal timers to keep track of when peaks or valleys occur for each of the accelerometer-amplifier pairs (X and Y). The time difference between the occurrence of a peak and a valley corresponds to half a cycle, so by multiplying this time difference by two, the instantaneous signal period is obtained. A second table is used to correlate the period to the signal's intensity (313, which step is shown in FIG. 3). If the overall signal magnitude (combination of X and Y) is larger than the threshold for a particular time period, the signal is interpreted as being that from an earthquake (314). The microcontroller then proceeds to the earthquake ALARM condition (315). Here, the ALARM LED (104) and buzzer (109) are activated, along with earthquake relay (212). These remain activated until reset (107).

Figure 5:
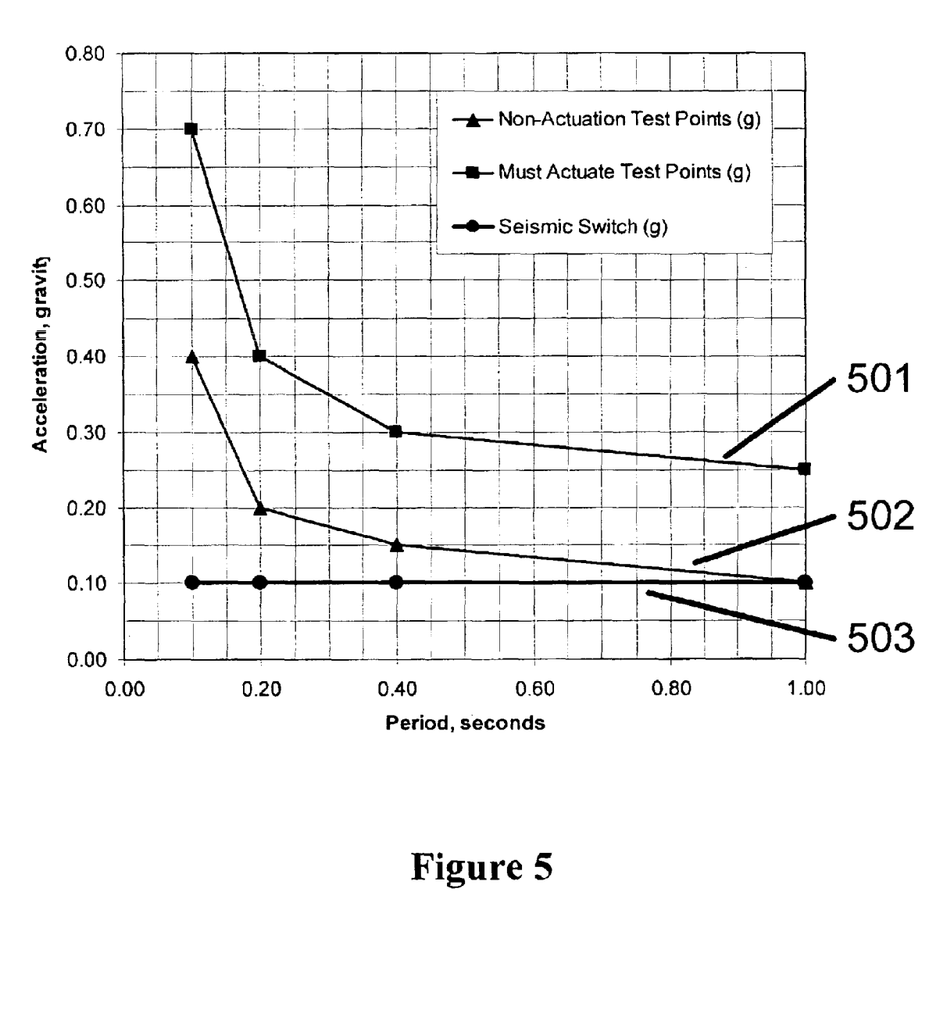
FIG. 5 is a graph showing the values required for earthquake-actuated automatic gas shutoff devices (ASCE 25-97) and the seismic switch.

Turning to FIG. 5, the operating parameters for automatic gas-valve shut-off devices as promulgated by ASCE standard 25-97 are shown along with the one preferred set of operating parameters for the seismic switch. Acceleration is plotted along the vertical axis and period is plotted along the horizontal axis. The must-actuate test points are shown along line 501. If a signal exceeds this line, under the ASCE standard 25-97, the gas-valve shut-off device must turn off. The non-actuation test points are shown along line 502. If a signal falls below this line, under the same standard, the gas-valve shut-off device may not turn off. The preferred threshold for the seismic switch is shown along line 503. Notably, it falls entirely below line 501, and only meets line 502 at the right-most data point.

This lower threshold is chosen to release doors even though only minor seismic activity has been detected. In applications such as a crowded commercial establishment, the seismic switch may be used to control the release of doors either directly or through a security system. When a minor earthquake occurs, it may not require that gas valves or similar such devices be turned off, but may still frighten people. In that event, if emergency doors were to remain locked and closed, people in a crowded commercial establishment may panic and rush for other exits. Such crowd panic can have seriously devastating results. To avoid this, emergency doors should be released even upon detection of minor seismic activity.

Accordingly, if a signal being measured has a magnitude larger than that specified for the actuation threshold for the signal's period, the valve must be shut-off. In order to make the seismic switch more sensitive to earthquakes, a threshold value of 0.1 g is used for all signal periods between 0 and 1 second as illustrated in FIG. 5. In this manner, if a signal is being interpreted as that from an earthquake, the seismic switch activates (315) the corresponding relay (212) and the audible alarm (109).

Turning to FIG. 6 one preferred interaction between a seismic switch (405), a main control panel (602) to which the switch (405) is connected, a door (605) being controlled by the control panel (602), and a communication link (603) connecting to a remote monitoring center (604) is shown. In operation, the seismic switch (405) monitors for seismic signals. If any are detected, it determines whether it is an earthquake or an explosion. In the event of an earthquake, an earthquake signal (indicated by a closing relay) is sent to the main control panel (602); in the event of an explosion, an explosion signal (also indicated by a closing relay) is sent to the main control panel (602). The main control panel (602) includes other security functions. For example, it receives fire detection, intrusion, and any other security-related signals. In response to an earthquake signal, the main control panel (602) releases doors (605). In a preferred embodiment, the main control panel (602) does not call the remote monitoring center (604) because if all security systems were to place such a call during an earthquake all circuits would become busy. In alternative embodiments, it could, nonetheless, place such a call. In response to an explosion signal, the main control panel (602) releases doors (605) and calls the remote monitoring center (604). The doors (605) can be standard doors such as those used in the patents described above along with the background of the invention. Alternatively, the doors (605) may be part of a security door system used in banks and other commercial establishments (also known as man-trap doors) and as described in U.S. Pat. No. 6,308,644, titled "Fail-Safe Access Control Chamber Security System," and U.S. Pat. No. 6,298,603, titled "Access Control Vestibule," both by the instant inventor and both of which are expressly incorporated herein by reference in their entirety.

Physically, the main control panel typically is constructed of a metal box having a keyed access door. The seismic switch as shown and described is approximately the size of a small battery so that it can fit inside the box containing the main control panel. Alternatively, the seismic switch can be used to control the release of one or more doors directly without a main control panel.

As those skilled in the art will appreciate, many variations and modifications can be made to the preferred embodiments described above without departing from the spirit of the invention. All such variations and modifications are intended to be encompassed within the scope of the following claims.

I claim:

1. An emergency control system comprising:
a set of accelerometers that generate electronic signals in response to vibrations caused by an earthquake or an explosion;
a controller operationally coupled with the set of accelerometers and configured to receive the electronic signals and to determine whether the electronic signals represent an earthquake or an explosion;
a first switch operationally coupled with the controller and with a door control circuit, wherein the controller toggles the first switch upon detection of an earthquake to release the door control circuit; and
a second switch operationally coupled with the controller, with the door control circuit and with an emergency call circuit, wherein the controller toggles the second switch upon detection of an explosion to release the door control circuit and to activate the emergency call circuit, and wherein the first switch does not activate the emergency call circuit upon detection of an earthquake.

2. The emergency control system of claim 1, wherein the set of accelerometers comprise a first accelerometer configured to detect vibrations along a first axis and a second accelerometer configured to detect vibrations along a second axis, orthogonal to the first axis.

3. The emergency control system of claim 2, wherein the set of accelerometers further comprise a third accelerometer configured to vibrations along a third axis, orthogonal to the first axis and the second axis.

4. The emergency control system of claim 1, wherein the controller comprises analog-to-digital converters and wherein the electric signals generated by the set of accelerometers are received by the analog-to-digital converters.

5. The emergency control system of claim 1, wherein the first switch and the second switch each comprise a relay.

6. The emergency control system of claim 1, wherein the first switch and the second switch each comprise an electronic switch.

7. The emergency control system of claim 1, further comprising an alarm indicator operationally coupled with the controller and configured to indicate an alarm condition upon detection of either an earthquake or an explosion by the controller.

8. The emergency control system of claim 7, further comprising a keyed reset switch operationally coupled with the controller to reset the alarm condition.

9. The emergency control system of claim 1, further comprising a set of amplifiers operationally coupled between the set of accelerometers and the controller and configured to amplify the electronic signals from the set of accelerometers before passing to the controller.

10. The emergency control system of claim 1, wherein the controller determines whether the electronic signals represent an earthquake or an explosion by comparing a representation of the electronic signals to a table of data.

11. The emergency control system of claim 1, wherein:
the set of accelerometers comprise a first accelerometer configured to detect changes in velocity along a first axis and a second accelerometer configured to detect changes in velocity along a second axis, orthogonal to the first axis, and a third accelerometer configured to detect changes in velocity along a third axis, orthogonal to the first axis and the second axis;
the controller comprises analog-to-digital converters and wherein the electronic signals generated by the set of accelerometers are received by the analog-to-digital converters;
the first switch and the second switch each comprise a relay; and
the emergency control system further comprises:
a set of amplifiers operationally coupled between the set of accelerometers and the controller and configured to amplify the electronic signals from the set of accelerometers before passing to the controller;
a visual alarm indicator and an audible alarm indicator each operationally coupled with the controller and configured to indicate an alarm condition upon detection of either an earthquake or an explosion by the controller; and
a ready indicator coupled with the controller and configured to indicate the proper functioning of the emergency control system;
a keyed reset switch operationally coupled with the controller to reset the alarm condition; and
a test switch operationally coupled with the controller to test the system.

12. The emergency control system of claim 11, further comprising an explosion-proof and water-tight housing having a front face, wherein the set of accelerometers, the set of amplifiers, the controller, the first switch and the second switch are mounted within the explosion-proof and water-tight housing, and wherein the visual alarm indicator, ready indicator, the keyed reset switch, and the test switch are mounted on the front face.

13. A door control system comprising:
a means for detecting an earthquake;

a means for detecting an explosion;

a means for releasing a door;

a means for signaling an alarm;

a means for initiating signals to a remote monitoring center;

a control circuit operationally coupled with the means for detecting an earthquake, the means for detecting an explosion, the means for releasing a door, the means for signaling an alarm, and the means for initiating signals to a remote monitoring center, wherein when the means for detecting an earthquake detects an earthquake then the control circuit activates the means for releasing a door and the means for signaling an alarm but not the means for initiating signals to a remote monitoring center, and wherein when the means for detecting an explosion detects an explosion then the control circuit activates the means for releasing a door, the means for signaling an alarm and the means for initiating signals to a remote monitoring center.

14. The door control system of claim 13, further comprising a means for amplifying an electronic signal operationally coupled with the means for detecting an earthquake, the means for detecting an explosion and the control circuit, wherein the means for detecting an earthquake and the means for detecting an explosion generate electronic signals that are amplified by the means for amplifying an electronic signal.

15. The door control system of claim 13, further comprising a means for converting an analog signal to a digital representation of the analog signal operationally coupled with the means for amplifying an electronic signal, and a means for comparing the digital representation of the analog signal to a table of data, wherein the comparison determines whether the representation of the analog signal indicates an earthquake or an explosion.

16. The door control system of claim 13, further comprising a means for protecting the means for detecting an earthquake, the means for detecting an explosion, the means for releasing a door, the means for signaling an alarm, the means for initiating an emergency call and the control circuit from an explosion.

17. The door control system of claim 13, further comprising a means for modifying the functionality of the control circuit.

18. The door control system of claim 13, further comprising a means for detecting failure of the control circuit and the means to indicate that failure by a visual signal.

19. A method of responding to an emergency comprising the steps of:

generating an electronic signal in response to a seismic event;

converting the electronic signal to a digital representation;

determining whether the seismic event was an earthquake or an explosion by comparing the digital representation to a table of data;

signaling a control circuit in response to the step of determining that the seismic event was either an earthquake or an explosion; and activating signals to a remote monitoring center circuit only in response to the step of determining that the seismic event was an explosion but not in response to the step of determining that the seismic event was an earthquake.

20. The method of responding to an emergency of claim 19, further comprising the step of amplifying the electronic signal before the step of converting the electronic signal to the digital representation.

21. The method of responding to an emergency of claim 20, further comprising the step of generating an audible alarm in response to the step of determining that the seismic event was either an earthquake or an explosion.

22. The method of claim 21, further comprising the step of resetting the control circuit, the emergency call circuit and the audible alarm in response to a keyed switch.

23. The method of claim 19, wherein the step of signaling the control circuit comprises releasing a man-trap door.

24. The method of claim 19, wherein the step of signaling the control circuit comprises shutting off equipment.

* * * * *